E. NALL, DEC'D.
E. A. NALL, EXECUTRIX.
MACHINE FOR THE MANUFACTURE OF ASBESTOS GASKETS.
APPLICATION FILED JULY 31, 1918.

1,374,463. Patented Apr. 12, 1921.
4 SHEETS—SHEET 1.

Inventor
BY EDWARD NALL, DECEASED
EDITH ALICE NALL, EXECUTRIX

Attorney

E. NALL, DEC'D.
E. A. NALL, EXECUTRIX.
MACHINE FOR THE MANUFACTURE OF ASBESTOS GASKETS.
APPLICATION FILED JULY 31, 1918.
1,374,463.
Patented Apr. 12, 1921.
4 SHEETS—SHEET 2.
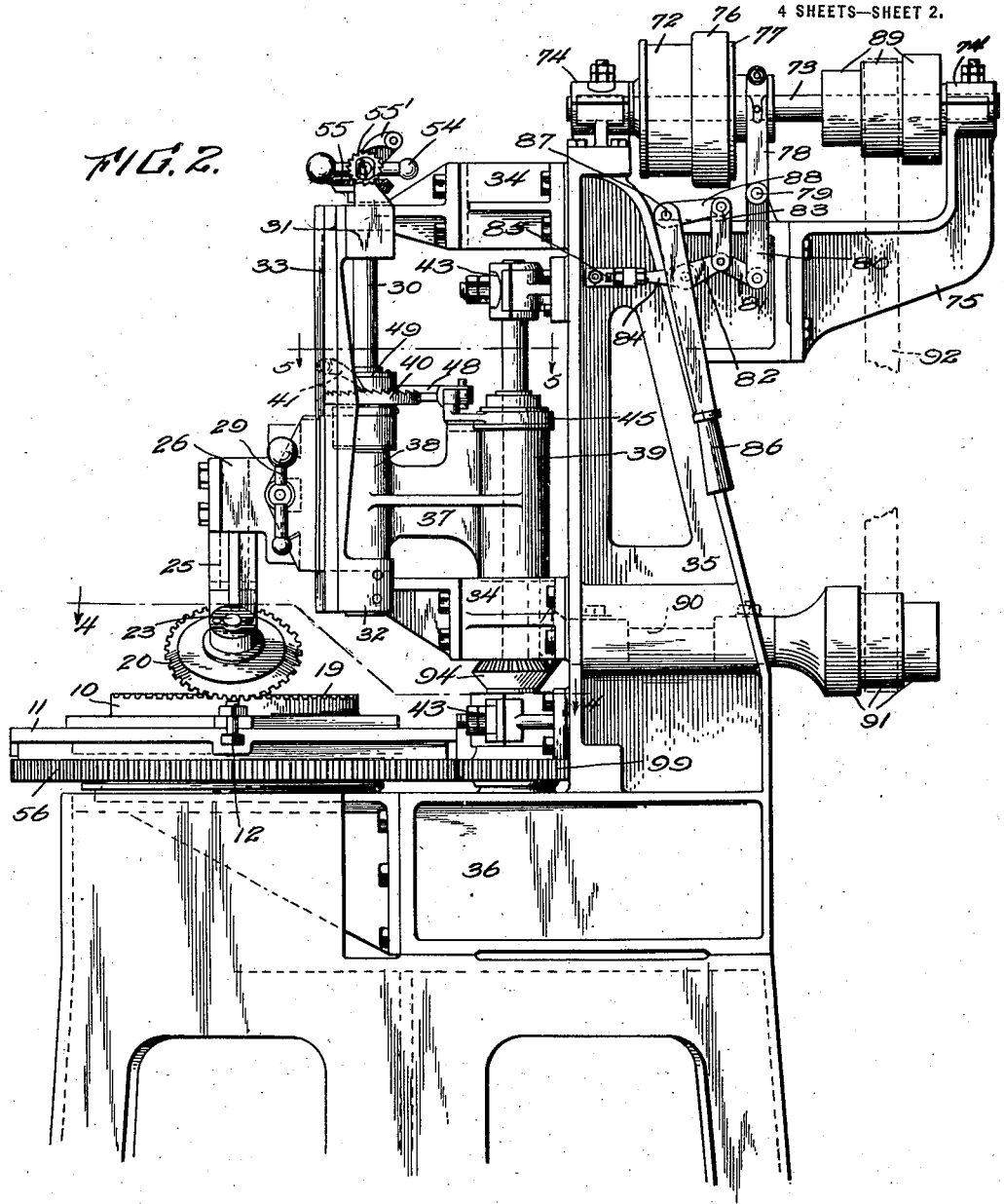
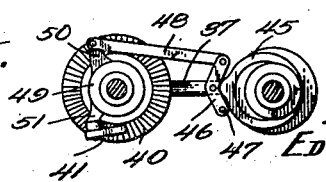
INVENTOR
BY EDWARD NALL, DECEASED
EDITH ALICE NALL, EXECUTRIX
Attorney.

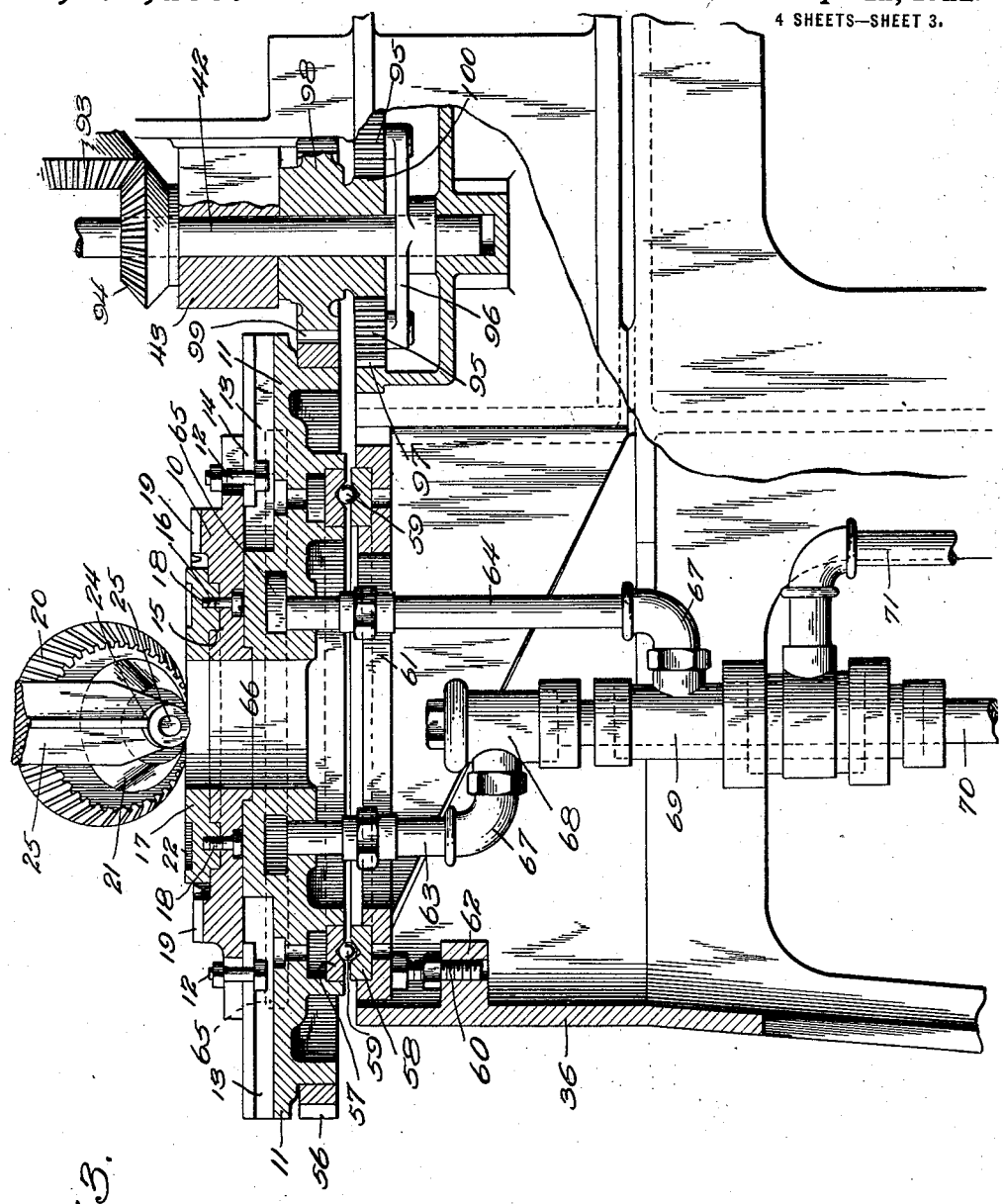

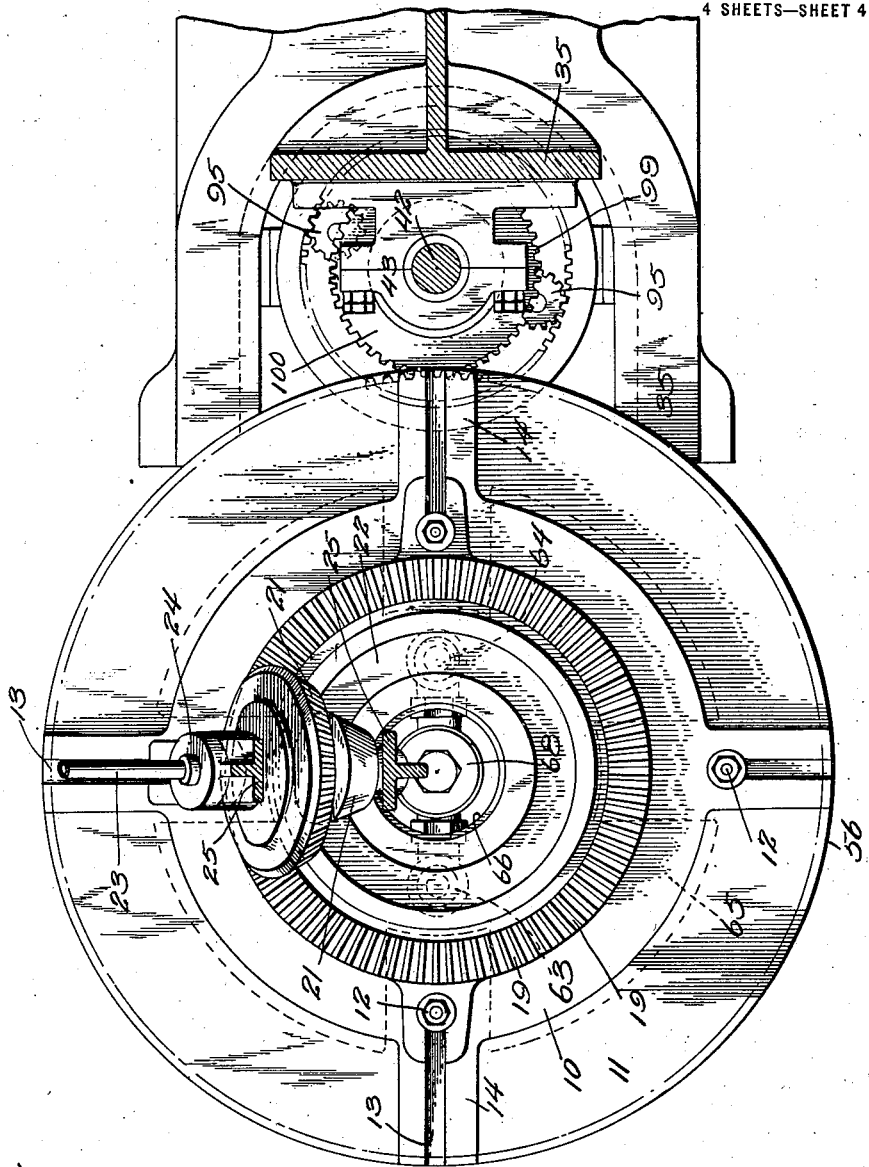

UNITED STATES PATENT OFFICE.

EDWARD NALL, DECEASED, BY EDITH ALICE NALL, EXECUTRIX, OF AKRON, OHIO, ASSIGNOR TO THE GOODYEAR TIRE & RUBBER COMPANY, OF AKRON, OHIO, A CORPORATION OF OHIO.

MACHINE FOR THE MANUFACTURE OF ASBESTOS GASKETS.

1,374,463.   Specification of Letters Patent.   Patented Apr. 12, 1921.

Original application filed February 15, 1917, Serial No. 148,830. Divided and this application filed July 31, 1918. Serial No. 247,698.

*To all whom it may concern:*

Be it known that I, EDITH ALICE NALL, residing at Akron, Summit Co., Ohio, executrix of the estate of EDWARD NALL, deceased, do hereby make application for Letters Patent of the United States covering the invention of said EDWARD NALL of Improvements in Machines for the Manufacture of Asbestos Gaskets, of which the following is a specification.

The present invention relates to the production of a flexible strip of material from a relatively plastic mass of the material, and especially relates to the manufacture of asbestos gaskets in the form of integral annuli. More specifically, the invention comprehends both an improved method of manufacture and the preferred type of machine which I employ to practise the improved method.

This application is a division of application of Edward Nall, filed February 15, 1917, Serial No. 148,830, Patent 1,307,788, June 24, 1919.

Asbestos gaskets, as now manufactured, are cut or stamped in ring form from a flat sheet of the asbestos material. This not only results in wasteful production, owing to the large number of irregular scraps remaining, but also results in the production of gaskets in which the asbestos fibers run at various angles to the circumference, a direct source of weakness in the finished article.

It is with cognizance of these conditions that the present method and machine for rolling packing strips or gaskets in their desired finished form from masses of the raw material is provided. It is contemplated as one of the principal objects of the invention to produce a packing ring in which there shall be absolutely no waste of material, and it is a coördinate object to provide a machine and method of manufacturing annular packing strips or gaskets which lays the asbestos fibers circumferentially in such integral grouping that a greater strength and increased resistance to blowouts is gained in the finished article without the necessity of added material.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Fig. 2 is a side elevational view of the machine;

Fig. 3 is a sectional view taken through the mold and the support means therefor, showing the heating mechanism arranged in conjunction therewith;

Fig. 4 is a sectional view taken upon the line 4—4 of Fig. 2; and

Fig. 5 is a detail view taken upon the plane of line 5—5 of Fig. 2.

Figure 1:
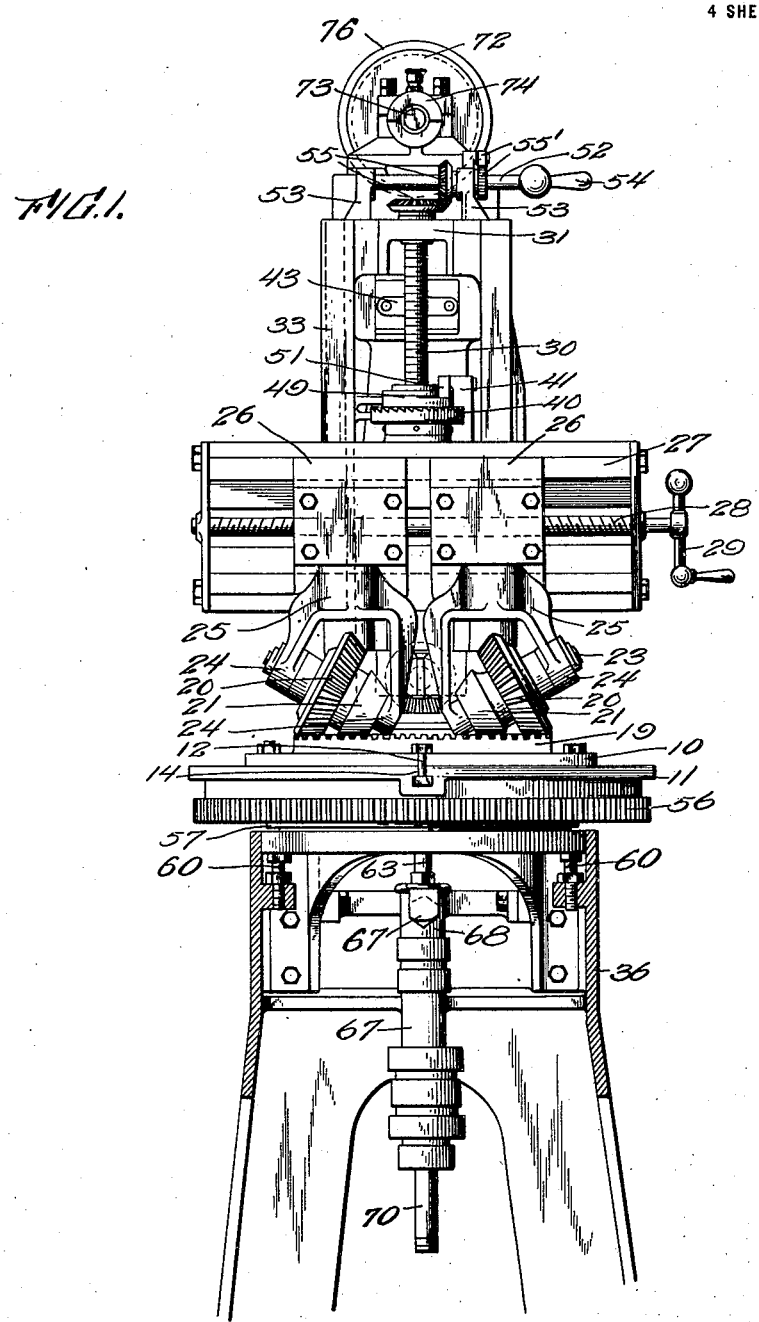
Figure 1 is a front elevational view of the machine proposed herein, parts of the base stand or pedestal being shown in section.

The method comprised in the present invention is predicated upon the action of rolls which are adapted to smooth a mass of the raw packing composition into a heated flat mold which conforms exactly to the dimensions of the finished article. The machine to be herein disclosed comprises an arrangement of mechanical details whereby the method outlined above may be desirably accomplished and includes means whereby gaskets of different diameters and thicknesses may be produced at will.

Each size of gasket to be manufactured has its own particular mold plate, each plate being provided with an annular channel which conforms to the final dimensions of the gasket to be produced. A pair of rolls operate upon a mass of material placed in this channel in order to smooth and compress it exactly to the form of the mold, the latter being heated while the gasket is being rolled therein, to "cure," or solidify, the asbestos compound.

Having reference primarily to Figs. 1 and 3, the numeral 10 designates a support plate which is removable from the machine for the securement thereto of various size molds. This plate rests upon a rotatable heater or support head 11 to which it is secured through the medium of bolts 12, the head 11 being radially slotted in the manner denoted in Figs. 3 and 4 by the numeral 13, each of the slots 13 being provided with an edge overhang 14 against which the bolt heads abut.

The plate 10 is provided with an annular channel 15 to accommodate the rib 16 of the mold 17, fastening means 18 being countersunk through the bottom of the support plate 10 and passing through the annular rib of the mold plate to secure the latter firmly in position. Arranged upon the outer periphery of the plate 10 is a crown gear 19 with which there are adapted to mesh the beveled pinions 20 of the asbestos rolls 21. These latter are conoidal and are mounted at an incline in order to roll within the flat channels 22 of the various horizontal molds which may be used in turn upon the support plate.

The shafts 23 of the forming rolls are mounted within inclined bearing 24, the bearings being supported from yoke members 25. These latter are mounted within cross-heads 26 which are reciprocable within a guide frame 27, their movements being commonly controlled by an adjusting shaft 28 whose extremities are threaded in opposite directions. A handle 29 is arranged upon one extremity of the shaft 28 in order that the operator of the machine may control the arrangement of the rolls 21 at the proper spacing to correspond with the diameter of the channels 22 of various mold plates.

A vertical adjustment is permitted the rolls whereby the pressure upon the mass of asbestos in the mold plate channel may be regulated. The main element of this vertical adjustment is the screw shaft 30, whose extremities are journaled within bearings 31 and 32 which are arranged in the upper and lower ends of the frame piece 33, the latter being supported by brackets 34 from the frame arm 35. This latter arm is erected upon the main stand or pedestal 36 of the machine and serves to support the various drive elements in a manner later to be set forth. Upon the screw shaft 30 there is mounted a slidable duplex bearing 37 which is formed with spaced cylindrical bearing portions designated by the numerals 38 and 39. The bearing portion 38 is arranged for movement longitudinally of the screw shaft and supports a ratchet disk 40 whereby rotation may be imparted to the shaft 30, upon which it is keyed, through the medium of a pawl member 41. The other bearing portion 39 of the duplex member is arranged for longitudinal movement upon a countershaft 42 which is journaled in vertical alined bearings 43 (Fig. 3). This shaft 42 is one of the intermediaries of the drive system, being employed as a countershaft for the indirect propulsion of the rotatable mold head 11.

Mounted upon the bearing portion 39 (Fig. 5) is an eccentric 45 which is adapted to be driven by rotation of the countershaft 42. The eccentric is connected to the center of the bell-crank lever shown at 46 in Fig. 5, one end of this lever being pivotally mounted at 47 upon the duplex bearing member 39 and the free extremity of the lever being connected to a pitman 48 which is thus given an oscillatory movement upon continued rotation of the drive shaft 42. Mounted upon the opposite bearing portion 38, is an oscillatable member 49 being formed with a pair of arms 50 and 51 the former being connected to the pitman 48 and the latter supporting the pawl member 41.

In this manner, rotation of the shaft 42 will impart a step-by-step movement to the screw shaft 30 so that the rolls 21 will be automatically fed down against the mass of asbestos material as the forming process of the gasket continues. In this manner, the gradual compression and solidification of the mold contents is assured. In order that the operator may increase or retard the feeding down of the rolls upon the mold plate, there has been provided a manually operable shaft 52 which is journaled in upright bearings 53 carried at the top of the frame piece 33. This shaft is provided with a handle 54 and has beveled gear connections covered by the numeral 55 with the screw shaft 30, the pawl 41 being readily disengaged temporarily, if it interferes with this manual adjustment. Pawl and ratchet means 55' govern the manual rotation of the shaft 52 in the obvious manner.

The support head 11 is equipped with a large drive gear 56 and is also provided with an annular ball race 57 which forms a bearing cage with a corresponding ball race 58 for the retention of antifriction bearings 59. The ball race 58 is horizontally supported upon the stand member 36, through the medium of adjustable means 60 whereby the mounting platform 61 for the ball race may be leveled up as required. The adjusting means 60 preferably comprises thumb screws having bearings within lugs 62 formed upon the interior of the walls of the base frame 36. The base platform 61 is formed with a large interior aperture for the accommodation of heater pipes 63 and 64, the latter leading to a substantially annular chamber 65 formed upon the interior of the support head 11, immediately below the support plate 10. This support plate 10 and the mold 17 are all apertured in alinement in the manner denoted by the numeral 66 which permits a more rapid and thorough conveyance of heat to all of the separate elements. As shown more particularly in Fig. 4, the endless chamber 65 is indented opposite the radial securing slots 13 of the support head, the normal diameter of this chamber being much larger than is apparent from the illustration of Fig. 3, which is a section taken through two of the indentations occurring along the path of the chamber.

The heater pipes 63 and 64 are connected by elbow joints 67 to respective rotary sleeves 68 and 69, the latter being supported upon the main feed pipe 70 which is connected with any suitable source of supply. The pipe 63 communicates, through its sleeve, directly with the inlet pipe 70 and serves as an inlet to the chamber 65, while the pipe 64 serves as the exhaust for the annular chamber, communicating through its rotatable sleeve 69 with the exhaust conduit 71. This particular arrangement has been adopted owing to the fact that the support head 11 is constantly driven, necessitating the mounting of the said pipes 63 and 64 for revolution.

The primary drive mechanism includes the main drum or pulley 72 which is loosely mounted upon the main drive shaft 73, the latter being supported within bearings 74 arranged upon the frame member 35 and upon a bracket arm 75 secured to such frame member. The pulley 72 is formed with a female clutch face 76 wherewith the male clutch member 77 is adapted to mate in order to transmit the drive of the pulley 72 to the shaft 73. Controlling movement of the male clutch member, and splined upon the shaft 73, is an operating yoke 78 which is pivoted at 79 to the bracket arm 75 and terminates in a lever extremity 80. A pair of link members 81 and 82 are similarly connected to the operating link 83, the link member 81 having swivel connections with the yoke end 80, and the link member 82 being mounted for adjustment upon the frame upright 35 through the medium of the thumb screw 85. A handle lever 86 is pivoted at the point 87 and has a bell-crank arm 88 connecting to one extremity of the operating link 83.

With the parts in the position illustrated in Fig. 2 a movement of the inverted lever in a clockwise direction will straighten out the link members 81 and 82 into alinement, exerting a counter-clockwise movement upon the yoke lever 80, the amount of such movement being regulated by the adjusting means 85. When the lever arm 80 is moved in a counter-clockwise direction the male clutch member 77 is forced home into the clutch member 76, thus unifying the shaft 73 with the pulley 72 for rotation. Mounted upon this drive shaft are coned pulleys 89 for the transmission of rotary movement to the secondary drive shaft 90 which is also equipped with oppositely coned pulleys 91, a belt 92 being utilized for transmission of power between these two sets of pulleys. The shaft 90 carries at its inner extremity beveled gear 93, meshing with the similar pinion 94 which is arranged upon the countershaft 42 in operative relation therewith. A differential drive gearing has been provided between the countershsaft 42 and the support head 11 for the mold plate, since it is not desired that said support head shall be driven at as great a rate of speed as that imparted to the countershaft.

This differential includes a pair of pinions 95 which are mounted upon the extremities of a diameter arm 96, the latter being keyed upon the countershaft 42. The pinions are adapted to mesh with the stationary internal gear 97, which is supported upon the lowermost bearing for the countershaft. Loosely mounted upon the latter is the duplex gear 98 which has one set of teeth 99 meshing with the large gear 56 of the support head, while a secondary set of gear teeth 100 engages simultaneously the two differential pinions 95.

In the operation of my machine, a channeled mold 17 is secured upon the plate 10 and the latter is arranged upon the rotatable support head 11 through the medium of the removable fastening means 12. A mass of asbestos compound, which may advantageously include shredded asbestos fibers mixed with rubber cement and benzin or similar agglutinants and thinning agents, the whole forming a plastic mass, is placed within the channel 22 of the mold plate, and the rolls 21 are then adjusted to the same diameter as the mold channel. The clutch 76—77 may then be thrown in, the dead center of the link members 81 and 82 forming a method of securing the clutch members against all accidental displacement. The support head 11 and support plate 10, as a whole is thus driven upon the base platform and the rolls are immediately and automatically fed down against the mass of asbestos, while rotating about the mold channel.

The operator in charge has supervision of the forming process of the gasket and removes the excess of material, or supplies deficiencies therein as the rolling continues. He also undertakes the acceleration or retardation of the feeding down of the rolls or other forming elements into the mold channel in order that he may secure the right degree of compressive power upon the asbestos compound. The admission of steam, or other heating agent, to the rotating head 11 is also under direct control of the operator through the employment of any suitable valve members, which it has not been thought necessary to illustrate in detail.

From the foregoing it will be apparent that the method herein disclosed is concerned with the rolling of a plastic compound into an open faced mold in such a manner that any degree of compression and drying may be secured for the mass, and in such a manner (for the production of an annular gasket from an asbestos composition) that the fibers of the asbestos will be laid circumferentially with respect to the finished annulus whose proportions are determined by the mold sizes. A machine is also disclosed which includes all of the necessary mechanical elements whereby the process may be put into efficient practice for the production of asbestos gaskets having every advantage and none of the objections seen to be inherent with gaskets manufactured under the prevailing processes.

It may be added that the substitution of forming elements of a slightly dissimilar nature for the rolls set forth by this invention is herein anticipated as the use of mere equivalencies. For instance, ring plates adapted to be rotated within the mold channel to compress the asbestos mass constitute a type of forming element to cover which the word "roll" is here defined as being employed throughout the description and claims of this invention in the generic sense of an element in movable contact with the plastic mass to be "rolled." Of the same character of modification is the construction of cylindrical rolls or of hollow forming elements into which heat may be admitted to supplement the action of the mold itself.

It will further be apparent that, by the employment of open faced molds of the proper shape, in the practice of the method and in the operation of the machine of this invention, strip packing or cup packing of any desired conformation may be produced without limitation other than such as may be imposed by the delineation of the invention in the appended claims.

What is claimed is—

1. A machine for producing a packing strip comprising, rotatable shaping elements one of which is adapted to impart rotative movement to the other elements through engagement therewith, the elements having their axes arranged in relative angular relation, means for effecting engagement of the last element with the first element, and means for adjusting the last elements laterally of the first element.

2. A machine for producing a packing strip comprising, rotatable shaping elements one of which is adapted to impart rotative movement to the other elements through engagement therewith, the elements having their axes arranged in relative angular relation, means for automatically effecting engagement of the last elements with the first element, and means for adjusting the last elements laterally of the first element.

3. In a machine for producing a strip of material from a relatively plastic mass of the material, a mold mounted for rotation and rolls coöperating with said rotatable mold to secure the compression and solidification of material placed within the mold.

4. A machine for producing a packing strip comprising, rotatable shaping elements one of which is adapted to impart rotative movement to the other elements through engagement therewith, the elements having their axes arranged in relative angular relation, means for automatically effecting engagement of the last elements with the first element, means for adjusting the last elements laterally of the first element, and auxiliary means for disengaging the elements.

5. In a machine for producing a strip of material from a relatively plastic mass of the material, an open-channeled mold of circular shape, and rolls commonly adjustable to the diameter of said mold and operable within the channel thereof to secure the compression and solidification of the contents of said mold.

6. In a machine for producing a strip of material from a relatively plastic mass of the material, a mold, and rolls commonly adjustable to the depth of said mold and operable therein to secure the compression and solidification of the contents of said mold.

7. In a machine for producing a strip of material from a relatively plastic mass of the material, a mold mounted for rotation and rolls commonly adjustable to the depth of said rotatable mold and operable therein to secure the compression and solidification of the contents of said mold.

8. In a machine for producing a packing strip from a relatively plastic material, a mold mounted for rotation, and rolls coöperating with the mold and automatically fed into the rotating mold to secure the gradual compression and solidification of the contents of said mold.

9. In a machine for producing a packing strip from a relatively plastic material, an open-channeled, rotatable mold and rolls driven by rotation of said mold and operating within the channel thereof to secure the compression and gradual solidification of the contents of said mold.

10. In a machine for producing a packing strip from a relatively plastic material, a mold, a heating apparatus arranged in conjunction with said mold and rollers coöperating with said mold to secure the compression and gradual solidification of the contents of said mold.

11. In a machine for producing a packing strip from a relatively plastic material, a mold mounted for rotation, a heating apparatus arranged in conjunction with said rotatable mold and rolls adjustable in two directions for a variable coöperation with said mold in securing the gradual compression and solidification of the contents of the mold.

12. In a machine for producing a packing strip from a relatively plastic material, a mold, a heating apparatus arranged in conjunction with said mold, rollers, means to feed the rollers automatically into the mold and means for manually adjusting the rollers in two directions for coöperation with the mold in securing the gradual compression and solidification of the contents of said mold.

13. In a machine for producing a packing strip from a relatively plastic material, a circularly channeled mold mounted for rotation; inlet and exhaust pipes of a heating apparatus arranged in conjunction with said mold; mold support means, and rollers driven from said support means and in such automatic coöperation with said mold as to secure the gradual compression and solidification of the contents of said mold.

14. In a gasket making machine, a circularly channeled mold mounted for rotation; inlet and exhaust pipes of a heating apparatus arranged in conjunction with said mold; and rolls manually and automatically adjustable in two directions for operation within the channel of said mold in securing the gradual compression and solidification of the contents of said mold.

15. In a gasket making machine, a circularly channeled mold mounted for rotation; a heating apparatus for the mold including stationary supply pipes and feed pipes movable relative to said supply pipes; and rollers adjustable with respect to said mold and operating within the channel thereof to secure the gradual compression and solidification of the contents of said mold.

16. In a gasket making machine, a circularly channeled mold mounted for rotation; a heating apparatus for the mold including stationary supply pipes and feed pipes movable relative to said supply pipes; and rollers automatically fed into the channel of said mold and manually adjustable to the channel depth and diameter in order to coöperate with said mold in securing the gradual compression and solidification of the contents of said mold.

17. In a gasket making machine, a circularly channeled mold mounted for rotation; a heating apparatus for the mold including stationary supply pipes and feed pipes connecting to said supply pipes and rotatable with said mold; and rollers commonly adjustable with respect to the channeled depth of said mold to secure the gradual compression and solidification of the contents of said mold.

18. A gasket making machine, including a rotatable support plate, a circularly channeled mold removably arranged upon said plate for rotation therewith and rollers also rotatable with said plate and adapted to coöperate with said mold in securing the gradual compression and solidification of the contents of the mold.

19. In a gasket making machine, a rotatable support plate; a gear arranged upon the edge of said plate; a mold removably mounted upon the center of said plate and rotatable therewith and rolls arranged for coöperation with said mold in securing the gradual compression and solidification of the contents of the mold, said rolls being geared to said plate gear for positive drive from the rotatable plate.

20. In a gasket making machine, a frame base; a support head mounted upon said base for rotation; a plate removably arranged upon said support head; a mold removably arranged upon said plate; means to heat said support head, plate, and mold; and rolls coöperating with said mold to secure the gradual compression and solidification of the contents of said mold.

21. In a gasket making machine, a frame base; a support head rotatably mounted upon said frame base and provided with an endless interior chamber; a support plate removably mounted upon said head; a mold removably mounted upon said plate; means for supplying heat directly to the chamber of said support head and indirectly to said support plate and mold; and rollers mounted to coöperate with said mold in securing the gradual compression and solidification of the contents of said mold.

22. In a gasket making machine, a frame base; a support head rotatably mounted upon said frame base and provided with an endless interior chamber; a support plate removably mounted upon said support head; a circularly channeled open mold removably mounted upon said plate; stationary supply pipes forming part of a heating apparatus and feed pipes connecting said supply pipes with the interior chamber of said support head, the said pipes being rotatable with the head and serving to heat, directly or indirectly, the head, the plate and the mold; and rolls mounted to coöperate with the channel of the mold in securing the gradual compression and solidification of the contents of said mold.

23. In a gasket making machine a frame base; a support head rotatably mounted upon said base and provided with an interior heating chamber; a circumferentially channeled mold plate arranged upon said support head; rolls coöperating with said head to secure the gradual compression and solidification of the contents of said mold; a countershaft; means for driving said countershaft; means for driving said support head from said countershaft at a reduced rate of speed; and means for automatically feeding the rolls into the channel of the mold plate, said last named means being driven from said countershaft.

24. In a gasket making machine, a frame base; a support head rotatably mounted upon said base and provided with an interior heating chamber; a circumferentially channeled mold plate arranged upon said support head; rolls coöperating with said head to secure the gradual compression and solidification of the contents of said mold; a countershaft; means for driving said countershaft; means for driving said support head from said countershaft at a reduced rate of speed; means for automatically feeding the rolls into the channel of the mold plate, and a step-by-step mechanism interposed between said automatically feeding means and said countershaft.

25. In a machine for producing a packing strip from a relatively plastic mass of packing material, a forming element in movable contact with the originally plastic mass to compress the same; and means regulating the compressing action of said element upon the mass.

26. In a machine for producing a packing strip from a relatively plastic mass of packing material, means for pressing and giving definite form to said originally plastic material comprising an element adapted to contact with said mass, means for rotating said element, and means for simultaneously adjusting the pressure of said element on said mass.

27. In a machine for producing a flat packing strip from a relatively plastic mass of packing material, means for pressing and giving definite form to said originally plastic material, comprising an element adapted to contact with said mass, means for rotating said element, and means for automatically adjusting the pressure of said element on said mass.

In witness whereof, I have hereunto signed my name in the presence of two subscribing witnesses.

EDITH ALICE NALL,
*Executrix of the estate of Edward Nall, deceased.*

Witnesses:
 A. H. LIDDERS,
 E. C. LEADENHAM.